E. WITZENMANN.
BRAKE PIPE FOR RAILWAY CARS.
APPLICATION FILED AUG. 16, 1909.
1,051,046.
Patented Jan. 21, 1913.
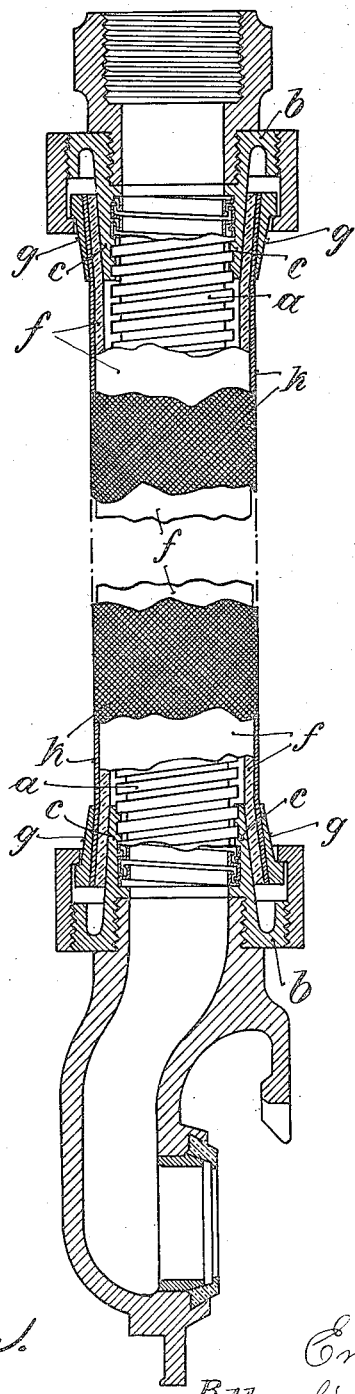

UNITED STATES PATENT OFFICE.

EMIL WITZENMANN, OF PFORZHEIM, GERMANY.

BRAKE-PIPE FOR RAILWAY-CARS.

1,051,046.  Specification of Letters Patent.  Patented Jan. 21, 1913.

Application filed August 16, 1909. Serial No. 512,955.

*To all whom it may concern:*

Be it known that I, EMIL WITZENMANN, manufacturer, a subject of the Grand Duke of Baden, residing at No. 48 Holzgartenstrasse, Pforzheim, German Empire, have invented new and useful Improvements in Brake-Pipes for Railway-Cars, of which the following is a specification.

The subject of my invention is a brake pipe for railway cars, constructed of a so-called spiral metallic hose (that is to say, a flexible pipe consisting of a spirally wound metal tape of suitable cross section), having a rubber pipe secured thereto so as to insure thoroughly tight joints.

The essential feature of the present invention resides in the peculiar construction of the connecting-pieces presented by the ends of the brake pipe, and in the peculiar manner in which the ends of the rubber pipe are secured to these connecting-pieces.

My invention is illustrated in the accompanying drawing.

The drawing shows a longitudinal section and part elevation.

$a$ is the spiral metallic hose of well known description. The metallic hose $a$ has end pieces $b$ attached thereto, said end pieces having cones $c$ formed thereon. A rubber pipe $f$ incases the metallic hose $a$, the ends of said pipe being drawn over the cones $c$ and a protective sheathing $k$ is tightly fitted over the rubber pipe $f$. Conical collars $g$ are fitted over the sheathing at the ends thereof and suitable means are provided for connecting the conical collars $g$ with the end pieces $b$ and for drawing said collars tightly to the end pieces in order to securely clamp the ends of the rubber pipe and sheathing between the cones $c$ and conical collars $g$, thereby insuring a thoroughly tight joint therebetween.

Having thus described my invention, I declare that what I claim is:—

A brake pipe for railway cars, comprising a spiral metallic hose, end pieces screwed thereon, cones formed on the end pieces, a rubber pipe incasing the metallic hose and extending over the said cones, a sheathing tightly fitting over this rubber pipe, conical collars fitted over the said sheathing at the ends thereof, and means connecting the conical collars with the end pieces for drawing the collars tightly to the end pieces in order to clamp the ends of the rubber pipe and sheathing, substantially as described.

In witness whereof I have hereunto signed my name this 31st day of July 1909, in the presence of two subscribing witnesses.

EMIL WITZENMANN.

Witnesses:
G. CHARLES,
HERMANN KRÖNER.